July 21, 1942.   W. H. VAN BENSCHOTEN   2,290,656
APPARATUS FOR MANUFACTURE OF STEREOGRAMS
Filed Aug. 6, 1940   2 Sheets-Sheet 1
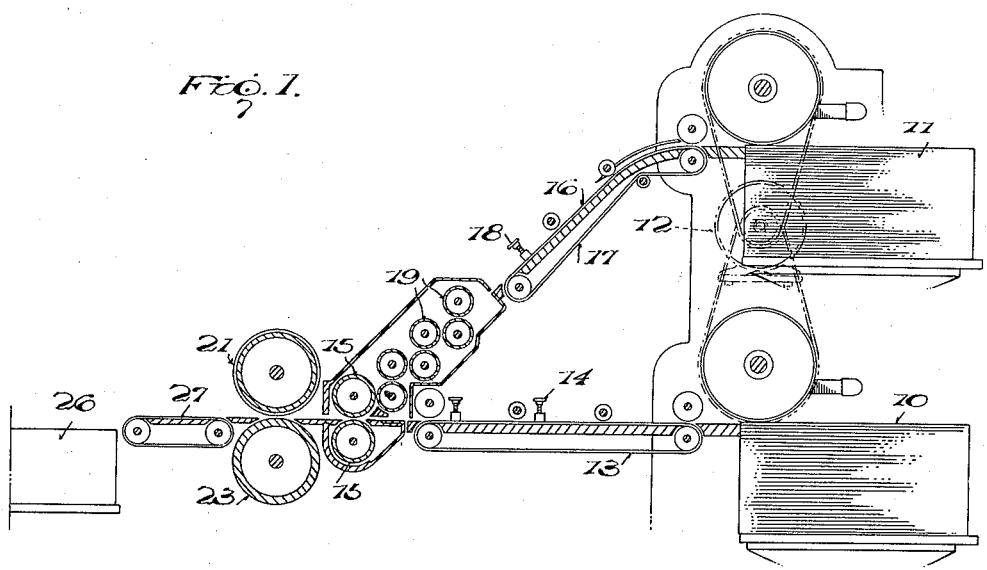
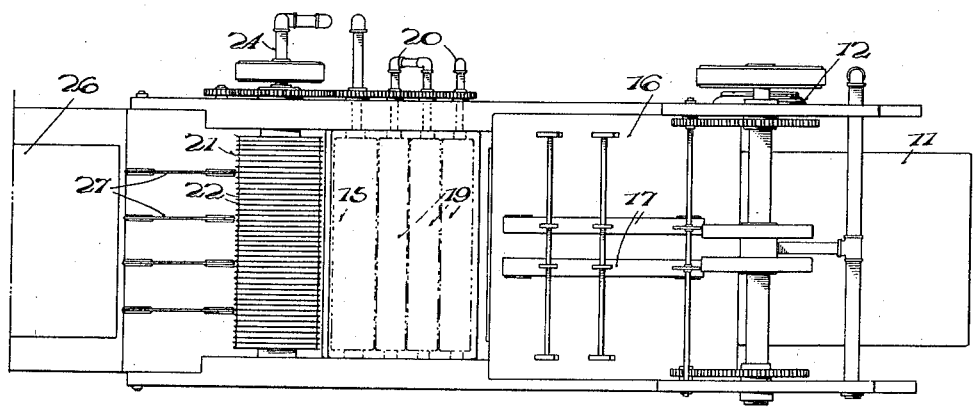
Inventor
WILLIAM HENRY VAN BENSCHOTEN
Attorney July 21, 1942.  W. H. VAN BENSCHOTEN  2,290,656
APPARATUS FOR MANUFACTURE OF STEREOGRAMS
Filed Aug. 6, 1940  2 Sheets-Sheet 2

Inventor
WILLIAM HENRY VAN BENSCHOTEN

By

Attorney

Patented July 21, 1942

2,290,656

UNITED STATES PATENT OFFICE 2,290,656

APPARATUS FOR MANUFACTURE OF STEREOGRAMS

William Henry van Benschoten, Washington, D. C.

Original application October 27, 1936, Serial No. 107,900. Divided and this application August 6, 1940, Serial No. 351,559

5 Claims. (Cl. 88—29)

My present invention relates generally to what are now more or less commonly known as stereograms and deals with the same as a product consisting of a sheet of material capable of bearing a composite picture of a pair of stereoscopic views disposed in narrow parallel and alternating strips, the picture surface being covered with a film-like transparent material having its upper surface formed in ridges paralleling and mating the picture strips, and forming cylindrical lenses through which the composite views are coordinated in a single picture appearing to be in three dimensions.

I am aware there is nothing new in the above product which produces the illusion of three dimensions upon an observer. I am not concerned with the formation of the composite picture. This may be printed mechanically or photographically and upon any material suitable to the adherence therewith of a transparent material, such as cellulose acetate when such material is in a condition of plasticity wherein it may be impressed with lens ribs in the upper surface thereof.

My primary object is the provision of an apparatus which will furnish the composite pictures with a properly placed and registered transparent film having a ribbed or ridged upper surface, in such a manner as to enable the speedy, economical and accurate production of stereograms. Up to the present time, stereograms have been made by a laborious hand method wherein a previously ridged lens surface film is affixed to the composite picture by means of a transparent adhesive or by other processes in such a manner as to give the desired effect.

As distinguished from these laborious hand methods, my invention aims to manufacture stereograms on a commercial scale efficiently, speedily, economically and accurately, permitting their widespread use and enjoyment, and making possible realization of the great recreational, educational, scientific and commercial possibilities of this product.

For the above purposes, and in a general way, my invention proposes a method wherein the composite picture is covered with a layer of transparent film forming material in a sufficiently plastic condition to adhere to the picture sheet and then, while said material is still sufficiently plastic, simultaneously pressing the material into firm adhesion with the sheet and pressing ridges in the surface of the material or film to form the lens through which the picture strips of the composite picture appear as a single picture. Such a method constitutes the subject matter of my copending application Serial No. 107,900, filed October 27, 1936, now Patent No. 2,219,158, dated October 29, 1940 of which this application is a true division.

This method as thus generally outlined contemplates the prefabricated picture sheet provided with the composite picture and the application thereto of a relatively soft transparent film simultaneously accompanied by, or immediately followed by, the formation of lens ribs in the softened film.

The present invention proposes an apparatus for bringing about the desired result by the application of localized predeterminedly distributed pressure on the softened film, such pressure effecting not only the formation of the lens structure, but, in addition, a permanent bonded union between the film sheet and the picture sheet.

In the detailed description to follow, reference is made to the accompanying drawings illustrating the invention and forming a part of this specification, and wherein, Fig. 1 is a vertical sectional view taken through a proposed apparatus constituting one form of the invention.

Fig. 2 is a top plan view thereof.

Figure 3:
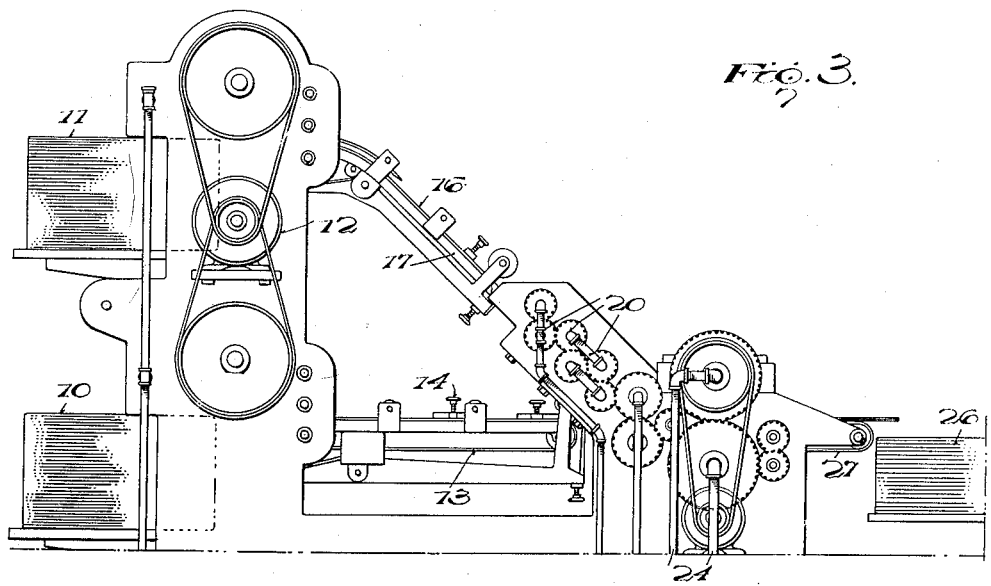
Fig. 3 is a side elevational view looking in the opposite direction with respect to Fig. 1.

Referring now to these figures and more particularly to Figure 1, I have shown a lower magazine 10 and an upper magazine 11 from which the uppermost sheets are fed in any suitable manner and by any suitable means, the operation of which is synchronized through suitable means, as, for instance, a common operating motor 12.

Sheets with previously formed composite pictures of the nature I have set forth are fed from the lower magazine 10, along a horizontal feed table as, for instance, by a feed belt 13, between side aligning guides 14 of any suitable character so as to insure their delivery in properly oriented position and timed relation to a pair of hollow feed rolls 15.

Similarly sheets of transparent material, previously formed and cut, are fed from the upper magazine 11 downwardly along an inclined feed table 16 as by means of a feed belt 17, between suitable aligning guides 18 to the upper end of a series of hollow softening rolls 19 and to these rolls as well as the hollow feed rolls 15, steam or other suitable heating fluid is supplied through the pipes 20 shown in Fig. 3.

The series of softening rolls 19 are preferably arranged to cause a serpentine movement of the film sheets therethrough whereby to bring about maximum surface contact and thus maximum heating and softening influence, insuring a properly softened condition of the films when delivered from the lower end of the heating rolls to the heated feed rolls 15 in properly oriented position and properly timed relation for application to the coresponding picture sheets as the latter and the films pass in unison between the feed rolls 15 and from the latter immediately to the larger hollow press rolls beyond the feed rolls 15.

The press rolls just referred to comprise an upper ridging roll 21 having a multitude of circumferential grooves 22, each groove of a width corresponding to the desired widths of the lens ridges to be formed on the upper surfaces of the then softened films. The lower roll 23 has a smooth surface which receives the lower face of the picture sheets and it is obvious that as each picture sheet passes through the rolls 21 and 23, not only will the lens ribs be formed in the upper surface of the plastic film, but the latter will be firmly and uniformly pressed against the picture surface and a secure lasting contact between these parts will be brought about. Simultaneously with the pressure of the lens forming ribs or ridges in the plastic film, a cooling thereof is desirable to avoid danger of any collapse of the lens and to this end the hollow press rolls 21 and 23 are preferably supplied with cold water through the cold water pipes 24 seen in Fig. 3.

It is also preferable that the heating and softening rolls 19 as well as the heated feed rolls 15 be enclosed within a suitable casing 25, which will have the effect of retaining the heat, and it will be noted from Fig. 1 that this casing extends close to the press rolls 21 and 23 so that the picture sheets and their films will pass immediately through the press rolls from the casing.

After passage through the press rolls 21 and 23, the completed articles may be discharged into a receiving tray or box 26 by means of a conveyor 27.

It is obvious from the foregoing that my invention is not dependent upon, nor concerned with, the manner in which the picture sheets are provided with their composite pictures, but is concerned with the application of a transparent film thereto and the adhesion of said film as well as its surface ridging to create the necessary lens opposite to the picture strips of the picture sheet.

Figure 4:
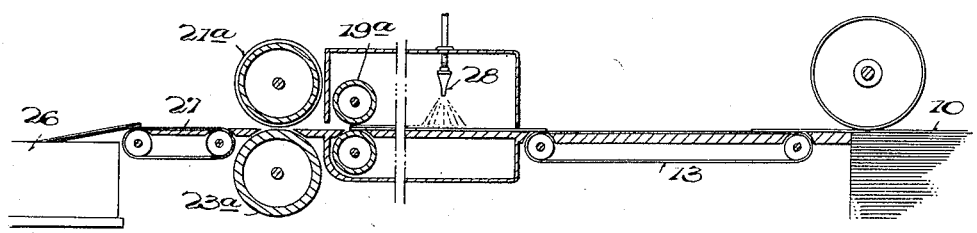
Fig. 4 is a side elevational view, partly in section, and more or less diagrammatic in its representation, illustrating the application of the lens film by spraying.

It must not be assumed that for the above purpose it is necessary, as previously described, to utilize previously formed film sheets for the carrying out of my improved method, however, since I may simply feed the picture sheets intermittently to a spray station where, as shown in Figure 4, the fluid material is sprayed on the picture sheets by a spray device 28. It is then possible the picture sheets coated in this manner may be immediately subjected to the action of the press rolls 21ª and 23ª, although it is more than likely they will present a better condition for pressure action if ample time is given for the evaporation of the solvent and they are passed between steam or otherwise heated rolls 19ª which will maintain the plastic coating in the properly soft condition necessary for the effective pressure ridging of the film by the rolls 21ª and 23ª.

Figure 5:
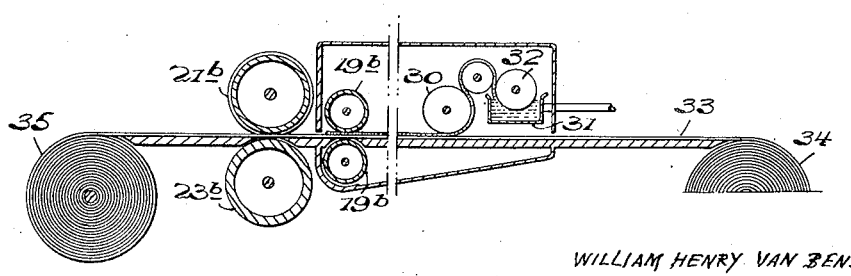
Fig. 5 is a similar view illustrating the lens film laid on by roller application.

It is also possible I may, instead of spraying on the coating film, apply the same directly, by roller application to the picture sheet, as seen in Figure 5. In this figure, the applying roll 30 takes its material from a suitable supply which may include a tank 31 and collecting cylinder 32, and the film may be continuously applied between heated rolls 19ᵇ to a continuous picture sheet or web 33 supplied from a feed roll 34 and subsequently wound upon a take-up roll 35. The structural details, apart from the ridging and pressing rolls, indicated in this figure at 21ᵇ and 23ᵇ, may, as in the other possible forms illustrated, be varied substantially at will.

Any of the well-known mechanisms for feeding and registering printed matter in the art of color printing may be employed in the feeding and registration of the previously printed or photographically produced picture sheets, with respect to the transparent films and the means, of whatever nature, utilized to apply the same to the picture sheets, so as to insure complete and uniformly correct registration.

What is claimed is:

1. In an apparatus for making stereograms, having right and left eye stereoscopic views adapted to be viewed simultaneously to produce the illusion of depth, means for feeding composite picture sheets having alternately disposed narrow band-like increments of the views disposed on one side thereof, means for applying transparent films of plastic material to the picture sheets comprising on the view-carrying side thereof means for feeding the film, means for maintaining said films in plastic condition during the feeding thereof, and press rolls between which the picture sheets with the superimposed films are fed, the upper of said rolls being grooved in a manner to continuously and progressively form lens ridges in the plastic films which overlie and are in register with at least two adjacent picture increments.

2. In an apparatus for making stereograms having right and left eye stereoscopic views adapted to be viewed simultaneously to produce the illusion of depth, means for applying transparent films to picture sheets having alternately disposed narrow band-like increments of the views disposed on one side thereof, and for simultaneously pressing said films into uniform adherence with the picture sheets on the view-carrying side thereof while forming lens ridges in the film surfaces in overlying register with at least two adjacent picture increments, including a pair of press rolls, one of which has a smooth surface and the other of which is provided on its cylindrical surface with a series of relatively narrow closely spaced parallel circumferential grooves, and guiding means for the picture sheets.

3. In an apparatus for making stereograms having right and left eye stereoscopic views adapted to be viewed simultaneously to produce the illusion of depth, means for feeding sheets of transparent thermoplastic film, means for heating the film during the feeding thereof, means for feeding composite picture sheets having alternately disposed narrow band-like increments of the views disposed on one side thereof, means for applying the plastic films to said picture sheets on the view-carrying side thereof while the former are plastic, said means consisting of press rolls, one of which is provided on its cylindrical surface with a series of relatively narrow closely spaced parallel grooves for pressing the films into close adherence with the picture sheets and at the some time forming lens ridges in the surface of the films in overlying relationship and register with adjacent plural picture increments.

4. In an apparatus for making stereograms having right and left eye stereoscopic views adapted to be viewed simultaneously to produce the illusion of depth, a support, means for advancing composite picture sheets having alternately disposed narrow band-like increments of the views disposed on one surface thereof continuously over the side of the support, a spray nozzle positioned above the support for spraying a plastic film-forming material onto the continuously moving composite sheet on the picture carrying side thereof, a pair of press rolls positioned to one side of the support for engaging the sprayed moving film therebetween, means for heating the rolls, and a pair of forming rolls adjacent the press rolls including an upper roller having a circumferentially grooved surface for forming lens-like ridges in the softened film in overlying relationship and register with a plurality of adjacent picture increments.

5. In an apparatus for making stereograms having right and left eye stereoscopic views adapted to be viewed simultaneously to produce the illusion of depth, a support, means for advancing composite picture sheets having alternately disposed narrow band-like increments of the views disposed on one surface thereof continuously over the surface of the support, a source of plastic material, an applicator roller for applying material withdrawn from said source to said sheets in the form of a film, a pair of press rolls positioned to one side of the support for engaging the sprayed moving film therebetween, means for heating the rolls, and a pair of forming rolls adjacent the press rolls including an upper roller provided on its cylindrical surface with a series of relatively narrow closely spaced parallel grooves for forming lens-like ridges in the softened film in register with adjacent picture increments, at least one of said latter rolls being hollow for the passage therethrough of a cooling fluid.

WILLIAM HENRY van BENSCHOTEN.

CERTIFICATE OF CORRECTION.

Patent No. 2,290,656. July 21, 1942.

WILLIAM HENRY van BENSCHOTEN.

It is hereby certified that error appears in the printed specification of the above numbered patent requiring correction as follows: Page 2, second column, line 35, claim 1, strike out "comprising" and insert the same after "thereof" in line 36, same claim; page 3, first column, lines 14 and 15, claim 4, for "surface thereof continuously over the side" read --side thereof continuously over the surface--; and that the said Letters Patent should be read with this correction therein that the same may conform to the record of the case in the Patent Office.

Signed and sealed this 1st day of September, A. D. 1942.

(Seal)

Henry Van Arsdale,
Acting Commissioner of Patents.